Figure 1:
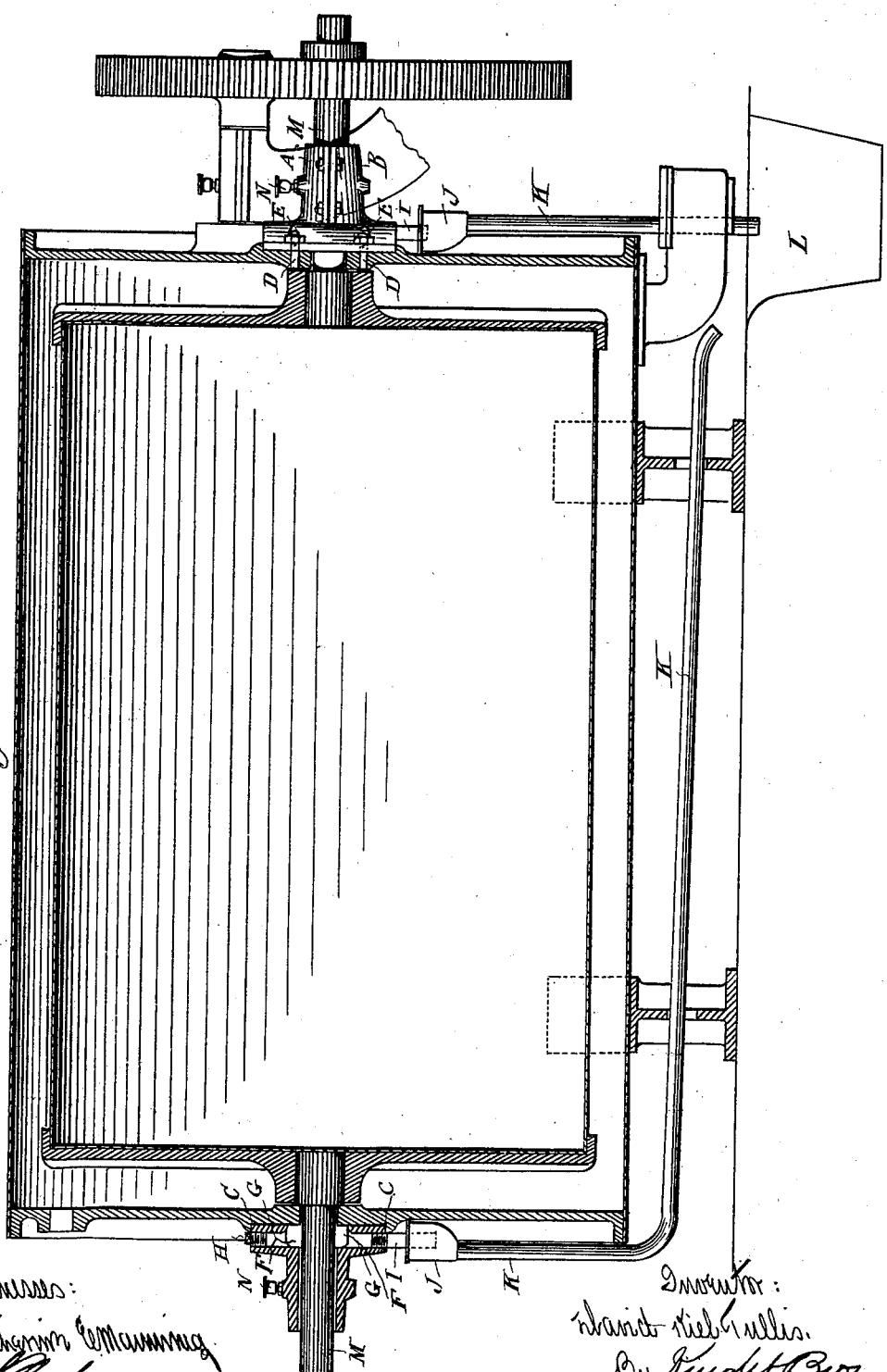

No. 658,052. Patented Sept. 18, 1900.
D. K. TULLIS.
JOURNAL BOX FOR WASHING MACHINES.
(Application filed May 28, 1900.)
(No Model.) 2 Sheets—Sheet 1.

No. 658,052. Patented Sept. 18, 1900.
D. K. TULLIS.
JOURNAL BOX FOR WASHING MACHINES.
(Application filed May 28, 1900.)
(No Model.) 2 Sheets—Sheet 2.
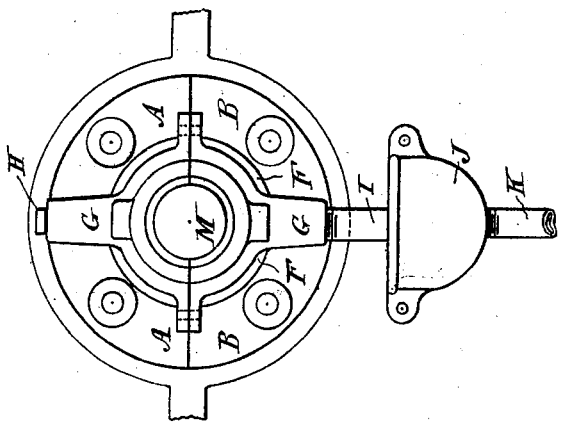
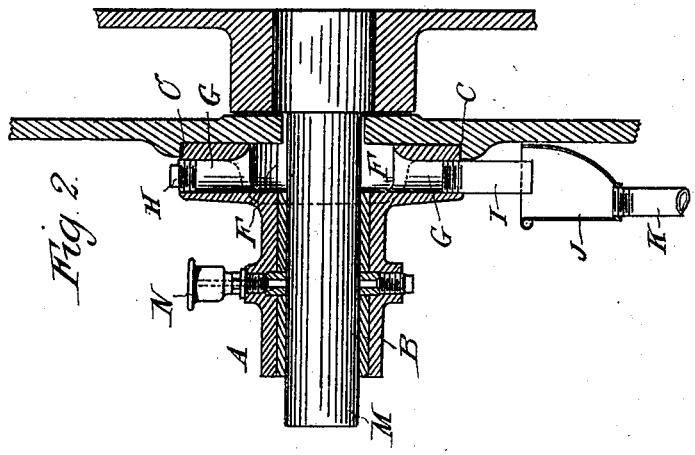
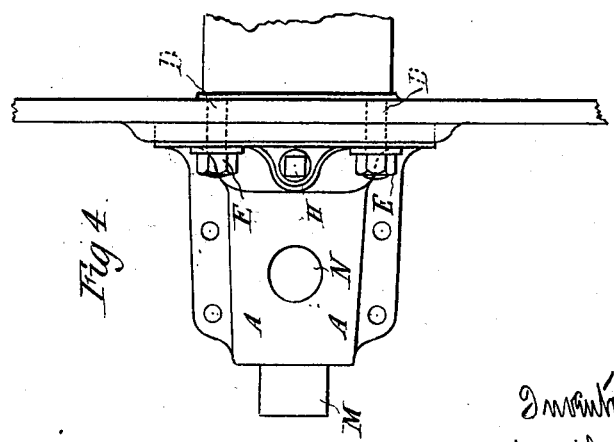

UNITED STATES PATENT OFFICE.

DAVID KIEL TULLIS, OF KILBOWIE, SCOTLAND.

JOURNAL-BOX FOR WASHING-MACHINES.

SPECIFICATION forming part of Letters Patent No. 658,052, dated September 18, 1900.

Application filed May 28, 1900. Serial No. 18,347. (No model.)

*To all whom it may concern:*

Be it known that I, DAVID KIEL TULLIS, engineer, of Kilbowie, in the county of Dumbarton, Scotland, have invented certain new and useful Improvements in Journal-Boxes for Washing-Machines, of which the following is a specification.

This invention relates to improvements in the journal-boxes of washing-machines, and has for its object to minimize the labor attached in fitting in new bushes in such machinery and to preserve the bearing from any acids or impurities used in the machinery and also to be able to lubricate the journals without injuring the goods being treated by the oil flowing through the journals into the machine.

In carrying out my invention the axle-box is made in pieces and bolted or otherwise fixed to the end of the machine. To preserve the bearing and to prevent the oil getting into the machine, I form a large recessed part at axle-box next to machine, from which there is led one or more drain-pipes which carry off the liquids and oil from the journal and bearing. This arrangement can be applied either to a low or high pressure machine.

Figure 1 is a sectional side elevation of a washing-machine to which my invention is applied. Fig. 2 is a longitudinal section of the journal-box embodying my invention. Fig. 3 is a front view, and Fig. 4 is a plan, of the same.

As illustrated in Figs. 3 and 4, the journal-box is made in two pieces A and B, which are bolted together. The said two sections A and B when connected fit into a recess C, formed on the end plates of the washing-machine, where they are securely held to the said end plates by screw-studs D and nuts E. An annular hollow enlargement F is formed in the axle-box adjacent to the end plates. A vertical tubular passage G communicates with this hollow recess F. The upper end of the said tubular passage G is closed by a screw-plug H, and into the lower end is inserted a drain-pipe I, which discharges into a cup or like receptacle J, leading by the pipe K to a drain L, Fig. 1. The spindle or axle M of the washing-machine is oiled by the lubricator N, and any superfluous oil or grease or other liquid used in the washing operation is collected in the hollow recess C, from which it is conducted away by the pipe I in the manner before mentioned. The two sections A and B of the bearing are essentially interchangeable and are so constructed that when the bottom one wears it can be reversed and the top one take its place.

I claim—

A journal-box for washing-machines, comprising two sections suitably bolted together, an annular hollow enlargement F formed in one end of the axle-box, a vertical tubular passage G, formed in said enlargement and communicating with the hollow portion thereof, a screw-plug closing the upper end of said passage, a drain-pipe secured in the lower end of said passage and a receptacle J into which said drain-pipe discharges.

In testimony whereof I affix my signature in presence of two witnesses.

DAVID KIEL TULLIS.

Witnesses:
 JOHN LIDDLE,
 EDITH MARY EDMONDSTONE.